United States Patent
Mitsuno

(10) Patent No.: US 8,974,890 B2
(45) Date of Patent: Mar. 10, 2015

(54) NONWOVEN FABRIC HAVING PROJECTIONS AND RECESSES, COMPRISING EXTENSIBLE FIBER AND ELASTIC FIBER, AND METHOD OF PRODUCING NONWOVEN FABRIC

(75) Inventor: Satoshi Mitsuno, Kanonji (JP)

(73) Assignee: Unicharm Corporation, Ehime (JP)

( * ) Notice: Subject to any disclaimer, the term of this patent is extended or adjusted under 35 U.S.C. 154(b) by 85 days.

(21) Appl. No.: 13/640,368

(22) PCT Filed: Apr. 14, 2011

(86) PCT No.: PCT/JP2011/059770
§ 371 (c)(1),
(2), (4) Date: Oct. 10, 2012

(87) PCT Pub. No.: WO2011/129466
PCT Pub. Date: Oct. 20, 2011

(65) Prior Publication Data
US 2013/0034686 A1    Feb. 7, 2013

(30) Foreign Application Priority Data
Apr. 16, 2010   (JP) ................. 2010-095246

(51) Int. Cl.
*D04H 3/00*     (2012.01)
*D04H 3/16*     (2006.01)
(Continued)

(52) U.S. Cl.
CPC . *D04H 3/16* (2013.01); *B32B 3/266* (2013.01); *D04H 3/02* (2013.01); *D04H 3/14* (2013.01);
(Continued)

(58) Field of Classification Search
CPC .................................. D04H 3/02; B32B 3/266
USPC .................................... 428/152, 131; 28/116
See application file for complete search history.

(56) References Cited

U.S. PATENT DOCUMENTS

| 4,209,563 A | 6/1980 | Sisson |
| 8,012,388 B2 | 9/2011 | Akaki et al. |

(Continued)

FOREIGN PATENT DOCUMENTS

| EP | 1876275 A1 | 1/2008 |
| EP | 2039816 A1 | 3/2009 |

(Continued)

OTHER PUBLICATIONS

An International Search Report, dated Jul. 19, 2011 in International Application No. PCT/JP2011/059770.

(Continued)

*Primary Examiner* — William P Watkins, III
(74) *Attorney, Agent, or Firm* — Lowe Hauptman & Ham, LLP

(57) ABSTRACT

It is an object of the invention to provide a nonwoven fabric having projections and recesses, comprising extensible fiber and elastic fiber, which has excellent feel on the skin and elasticity, and excellent air permeability in the planar directions and the thickness direction, as well as a method of producing the nonwoven fabric.

A nonwoven fabric having projections and recesses, comprising extensible fiber and elastic fiber, wherein the first surface of the nonwoven fabric has a plurality of projections and a plurality of recesses, and the proportion of extensible fiber in the projections is higher than the proportion of extensible fiber in the recesses.

20 Claims, 6 Drawing Sheets

(51) Int. Cl.
  *D04H 3/02*  (2006.01)
  *D04H 3/14*  (2012.01)
  *D04H 3/147*  (2012.01)
  *D04H 3/153*  (2012.01)
  *D06C 3/06*  (2006.01)
  *D04H 1/495*  (2012.01)
  *D04H 1/70*  (2012.01)
  *B32B 3/26*  (2006.01)

(52) U.S. Cl.
  CPC ............... *D04H 3/147* (2013.01); *D04H 3/153* (2013.01); *D06C 3/06* (2013.01); *D04H 1/495* (2013.01); *D04H 1/70* (2013.01)
  USPC ............... 428/152; 428/131; 28/116; 28/165

(56) References Cited

U.S. PATENT DOCUMENTS

| | | |
|---|---|---|
| 2003/0050615 A1 | 3/2003 | Sakamoto et al. |
| 2008/0044628 A1 | 2/2008 | Noda et al. |
| 2009/0035527 A1 | 2/2009 | Kobayashi et al. |
| 2010/0209667 A1* | 8/2010 | Mitsuno et al. ............... 428/152 |
| 2011/0042849 A1 | 2/2011 | Akaki et al. |
| 2013/0137328 A1 | 5/2013 | Mitsuno |

FOREIGN PATENT DOCUMENTS

| | | |
|---|---|---|
| EP | 2559795 A1 | 2/2013 |
| JP | 2003-126147 A | 5/2003 |
| JP | 2008-156785 A | 7/2008 |
| JP | 2008-248460 A | 10/2008 |
| JP | 2009-62650 A | 3/2009 |
| JP | 200962650 A | 3/2009 |
| JP | 2009-228145 A | 10/2009 |

OTHER PUBLICATIONS

Extended European Search Report issued Sep. 2, 2014, corresponding to European patent application No. 11768982.8.

* cited by examiner

NONWOVEN FABRIC HAVING PROJECTIONS AND RECESSES, COMPRISING EXTENSIBLE FIBER AND ELASTIC FIBER, AND METHOD OF PRODUCING NONWOVEN FABRIC

RELATED APPLICATIONS

The present application is based on International Application No. PCT/JP2011/059770, filed Apr. 14, 2011, and claims priority from, Japanese Application No. 2010-095246, filed Apr. 16, 2010.

TECHNICAL FIELD

The present invention relates to a nonwoven fabric having projections and recesses, comprising extensible fiber and elastic fiber, and to a method of producing the nonwoven fabric. The invention further relates to a nonwoven fabric having projections and recesses, comprising extensible fiber and elastic fiber, which has excellent feel on the skin and elasticity, and excellent air permeability in the planar directions and the thickness direction, as well as to a method of producing the nonwoven fabric.

BACKGROUND ART

Nonwoven fabrics are used in absorbent articles, such as sanitary products and disposable diapers, cleaning products, such as wipers, and medical goods, such as masks, and such products employ nonwoven fabrics with performance suitable for the purpose of the products and their intended location of use.

With absorbent articles, for example, it is necessary to employ nonwoven fabrics that expand and contract in response to bodily movement during wear or use, without creating an uncomfortable feeling for the user. Disposable diapers require nonwoven fabrics with high elasticity and strength sufficient to prevent tearing during extension, as well as satisfactory feel on the skin and air permeability.

When elastic fibers are used to impart elasticity to nonwoven fabrics, the elastic fibers generally have tack and high abrasiveness, which are known to impair the feel of the nonwoven fabric on the skin.

For example, Patent document 1 discloses a front sheet with an indented form, having excellent air permeability in the horizontal directions. The front sheet described in Patent document 1 is characterized by having a first fiber layer and a second fiber layer composed of fiber aggregates, by having the first fiber layer and second fiber layer laminated and partially heat sealed in a prescribed pattern, by forming in the first fiber layer elevated sections at locations other than the heat-fused sections between the first and second fiber layers, with the locations of the elevated sections that are adjacent to the heat-fused sections having their constituent fibers heat sealed together and thus having higher rigidity than the other locations of the elevated sections, and by having an air permeation volume of at least 10 mL/cm$^2$/sec in the horizontal directions under a pressure of 10 cN/cm$^2$.

However, the front sheet of Patent document 1 has a problem in that (i) because the elevated sections of the first fiber layer are formed by heat shrinkage of the second fiber layer, the distances between fibers in the second fiber layer are reduced as heat shrinkage occurs, thus lowering the air permeability of the sheet in the thickness direction. Another problem with the front sheet of Patent document 1 is that (ii) the second fiber layer comprising heat sealing fibers undergo melting during heat shrinkage, causing bonding between the fibers, and the front sheet is therefore hardened and less able to follow body movement, while also exhibiting inferior feel on the skin.

CITATION LIST

Patent Literature

PTL 1 Japanese Unexamined Patent Publication No. 2003-126147

SUMMARY OF INVENTION

Technical Problem

As stated above, nonwoven fabrics comprising elastic fibers have had inferior feel on the skin, and nonwoven fabrics with excellent air permeability in the horizontal directions have been hard with inferior feel on the skin.

It is therefore an object of the present invention to provide a nonwoven fabric having projections and recesses, comprising extensible fiber and elastic fiber, which has excellent feel on the skin and elasticity, and excellent air permeability in the planar directions and the thickness direction, as well as a method of producing the nonwoven fabric.

Solution to Problem

As a result of diligent research directed toward solving the problems described above, the present inventors have found a nonwoven fabric having projections and recesses, comprising extensible fiber and elastic fiber, wherein the first sidefirst surface of the nonwoven fabric has a plurality of projections and a plurality of recesses, and the proportion of extensible fiber in the projections is higher than the proportion of extensible fiber in the recesses.

Specifically, the present invention relates to the following J1 to J16.

A nonwoven fabric having projections and recesses, comprising extensible fiber and elastic fiber, wherein the first surface of the nonwoven fabric has a plurality of projections and a plurality of recesses, and the proportion of extensible fiber in the projections is higher than the proportion of extensible fiber in the recesses.

[J2]

The nonwoven fabric according to J1, wherein the nonwoven fabric has a plurality of projections and a plurality of recesses on the second surface, which is the side opposite the first surface, and the proportion of extensible fiber in the projections on the second surface is higher than the proportion of extensible fiber in the recesses on the second surface.

[J3]

The nonwoven fabric according to J2, wherein the projections and recesses on the first surface are parallel to a first direction, and are alternately arranged in the direction perpendicular to the first direction.

[J4]

The nonwoven fabric according to J3, wherein the projections and recesses on the second surface are parallel to a second direction, and are alternately arranged in the direction perpendicular to the second direction.

[J5]

The nonwoven fabric according to J4, wherein the first direction and the second direction are perpendicular.

[J6]

The nonwoven fabric according to J5, wherein the first direction is the machine direction, and the second direction is the cross direction that is perpendicular to the machine direction.

The nonwoven fabric according to any one of J2 to J6, which has one or a plurality of open holes connecting the recesses on the first surface and the recesses on the second surface.

[J8]

The nonwoven fabric according to any one of J1 to J7, wherein the material of the extensible fiber is selected from the group consisting of polyolefins, polystyrenes, polyesters, polyamides, polyurethanes, polylactic acid, and combinations thereof.

[J9]

The nonwoven fabric according to any one of J1 to J8, wherein the material of the elastic fiber is selected from the group consisting of polyurethane-based elastomers, polystyrene-based elastomers, polyolefin-based elastomers, polyamide-based elastomers, polyester-based elastomers, and combinations thereof.

[J10]

A method of producing a nonwoven fabric according to any one of claims 1 to 9, comprising the steps of:

providing a nonwoven fabric comprising extensible fiber and elastic fiber, non-homogeneous stretching the nonwoven fabric comprising extensible fiber and elastic fiber, so as to form a nonwoven fabric having high-stretch regions and low-stretch regions, and forming a nonwoven fabric having projections and recesses, comprising the extensible fiber and elastic fiber by placing the nonwoven fabric having high-stretch regions and low-stretch regions on a support and spraying a fluid onto the nonwoven fabric having high-stretch regions and low-stretch regions.

The method according to J10, wherein the step of non-homogeneous stretching is carried out by passing the nonwoven fabric comprising the extensible fiber and elastic fiber through the gap between a pair of gear rolls with rotational axis lines that are perpendicular to the machine direction, and rotating while a plurality of teeth arranged on the peripheral surfaces of each of the gear rolls are mutually engaged.

The method according to J11, wherein the plurality of teeth are arranged on the peripheral surfaces in a manner perpendicular to the rotational axis lines so as to form a nonwoven fabric having high-stretch regions and low-stretch regions each parallel to the machine direction and alternating in the cross direction which is perpendicular to the machine direction, or the plurality of teeth are arranged on the peripheral surfaces in a manner parallel to the rotational axis lines so as to form a nonwoven fabric having high-stretch regions and low-stretch regions each parallel to the direction perpendicular to the machine direction and alternating in the machine direction.

[J13]

The method according to any one of J10 to J12, wherein the step of non-homogeneous stretching is carried out twice.

[J14]

The method according to any one of J10 to J13, wherein in the step of forming the nonwoven fabric having projections and recesses comprising extensible fiber and elastic fiber, the support has protrusions and depressions with predetermined shapes and arrangement on the side in contact with the nonwoven fabric.

The method according to J14, wherein the protrusions and depressions having predetermined shapes and arrangement are each parallel to the cross direction which is perpendicular to the machine direction, and are alternately arranged in the machine direction.

The method according to any one of J10 to J15, wherein the fluid is selected from the group consisting of air, water vapor and water.

Advantageous Effects of Invention

The nonwoven fabric having projections and recesses comprising extensible fiber and elastic fiber according to the invention has excellent feel on the skin and elasticity.

The nonwoven fabric having projections and recesses comprising extensible fiber and elastic fiber according to the invention also has excellent air permeability in the planar directions and the thickness direction.

DESCRIPTION OF EMBODIMENTS

The nonwoven fabric having projections and recesses comprising extensible fiber and elastic fiber according to the invention, and the method of producing the nonwoven fabric, will now be explained in detail.

[Nonwoven Fabric Having Projections and Recesses Comprising Extensible Fiber and Elastic Fiber]

The nonwoven fabric having projections and recesses comprising extensible fiber and elastic fiber according to the invention (hereunder also referred to as "nonwoven fabric of the invention") has a plurality of projections and a plurality of recesses on the first surface, the proportion of extensible fiber in the projections being higher than the proportion of extensible fiber in the recesses.

Figure 1:
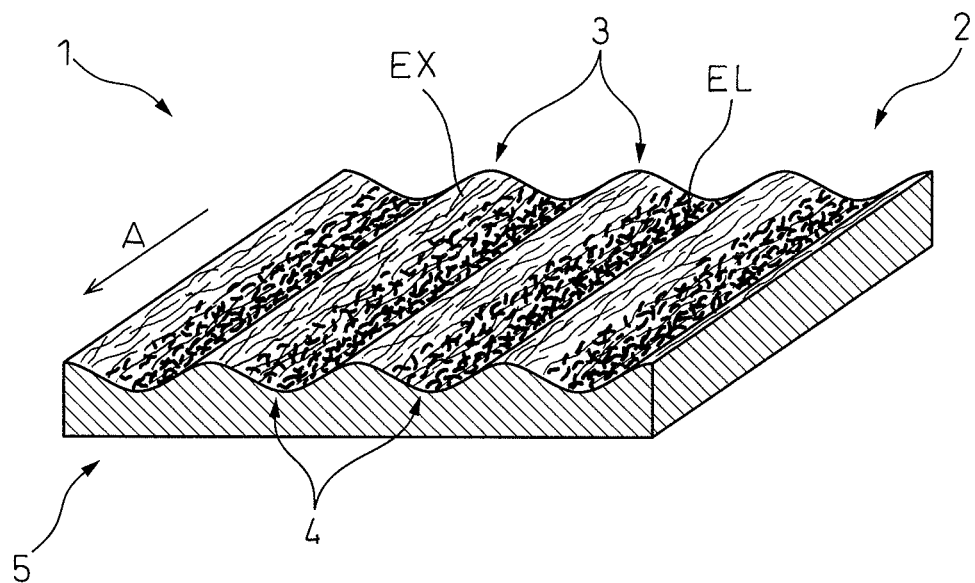
FIG. 1 is a schematic diagram showing one aspect of the nonwoven fabric having projections and recesses comprising extensible fiber and elastic fiber according to the invention.

FIG. 1 is a schematic diagram showing one aspect of the nonwoven fabric having projections and recesses comprising extensible fiber and elastic fiber according to the invention. The nonwoven fabric having projections and recesses comprising extensible fiber and elastic fiber 1, shown in FIG. 1, has a plurality of projections 3 and a plurality of recesses 4 on a first surface 2. In the nonwoven fabric having projections and recesses comprising extensible fiber and elastic fiber 1, shown in FIG. 1, the projections 3 are rich in extensible fiber EX while the recesses 4 are rich in elastic fiber EL, and the proportion of extensible fiber in the projections 3 is higher than the proportion of extensible fiber in the recesses 4. Also, in the nonwoven fabric having projections and recesses comprising extensible fiber and elastic fiber 1 shown in FIG. 1, the projections 3 and the recesses 4 are both parallel to the first direction A, and are alternately arranged in the direction perpendicular to the first direction A. In the aspect shown in FIG. 1, the extensible fiber EX in the projections 3 has orientation along the first direction A, while the elastic fiber EL in the recesses 4 has no particular orientation.

The "proportion of extensible fiber" referred to here is the proportion of extensible fiber at a given location with respect to the total fiber. The method of measuring the proportion is not particularly restricted so long as it allows measurement of the proportion of extensible fiber, and the following solvent method is an example.

(1) Fiber is sampled from a projection on the first surface of the nonwoven fabric of the invention, and weighed.

(2) The sample fiber is dissolved in a solvent capable of dissolving either the extensible fiber or the elastic fiber, and is allowed to stand for a fixed period of time, such as 30 minutes.

(3) The solution is filtered out, the remaining fiber is rinsed if necessary, and the remaining fiber is dried.

(4) The dry mass of the remaining fiber is measured and the proportion of the fiber is calculated.

The solvent may be selected as appropriate, and for example, when the extensible fiber is a polyolefin and the elastic fiber is a polyurethane-based elastomer, a solvent, such as dimethylacetamide or dimethylformamide may be selected in which the polyurethane-based elastomer is soluble and the polyolefin is insoluble. When the elastic fiber is a polystyrene-based elastomer, a solvent, such as toluene or xylene may be selected as a solvent in which it is soluble.

It may be measured in the same manner for the recesses on the first surface and for the projections and recesses on the second surface, as desired.

The "proportion" in the aforementioned solvent method is the mass ratio.

A separate method of measuring the proportion of extensible fiber is the following dyeing method.

(1) The nonwoven fabric of the invention is dyed using a dye having a different dye affinity for the extensible fiber than the dye affinity for the elastic fiber.

(2) An optical microscope or the like is used to record a projection image of the projections on the first surface.

(3) The proportion of extensible fiber is evaluated visually based on the image, or the image is binarized to distinguish between the extensible fiber and elastic fiber, and the proportion of extensible fiber is calculated.

This dyeing method is preferred for measuring the proportion of extensible fiber in nonwoven fabrics where a solvent method is not suitable.

It may be measured in the same manner for the recesses on the first surface and for the projections and recesses on the second surface, as desired.

The "proportion" in the dyeing method is the area ratio in the projection image.

From the viewpoint of the effect of the invention, and especially both the feel on the skin and elasticity, the proportion of extensible fiber in the projections on the first surface is preferably at least 1 mass % higher, more preferably at least 2 mass % higher, even more preferably at least 3 mass % higher and most preferably at least 5 mass % higher than the proportion of extensible fiber in the recesses on the first surface.

From the viewpoint of the effect of the invention, and especially both the feel on the skin and elasticity, the proportion of extensible fiber in the projections on the second surface is preferably at least 2 mass % higher, more preferably at least 4 mass % higher, even more preferably at least 6 mass % higher and most preferably at least 8 mass % higher than the proportion of extensible fiber in the recesses on the second surface.

A nonwoven fabric having projections and recesses comprising extensible fiber and elastic fiber, such as shown in FIG. 1, has a proportion of extensible fiber in the projections on the first surface that is higher than the proportion of extensible fiber in the recesses on the first surface, and it therefore exhibits excellent feel on the skin and excellent elasticity. The reason for this is as follows.

In general, elastic fiber has excellent elasticity, but also has the disadvantage of an inferior feel on the skin including tack and high friction, while extensible fiber has excellent feel on the skin but poor elasticity. The nonwoven fabric of the invention has extensible fiber, with poor elasticity but excellent feel on the skin, situated in the projections that contact the human body, and it therefore exhibits excellent feel on the skin. The nonwoven fabric of the invention also has its elastic fiber, with poor feel on the skin but excellent elasticity, arranged essentially uniformly in the recesses and inside the projections of the nonwoven fabric that do not easily contact the human body, and it therefore exhibits excellent elasticity.

The nonwoven fabric having projections and recesses comprising extensible fiber and elastic fiber, as shown in FIG. 1, also has a plurality of recesses, and therefore the air permeability of the nonwoven fabric in the thickness direction is excellent compared to a nonwoven fabric without recesses, while forming a plurality of projections and a plurality of recesses also provides the nonwoven fabric with excellent air permeability in the planar directions.

As used herein, "elastic fiber" means fiber that is capable of elastic elongation. More specifically, the elastic fiber is fiber that has a larger elastic limit than the stress applied during formation and during expected use, and that is capable of elastic elongation within the range of stress during formation and during expected use. Examples of elastic fiber materials include polyurethane-based elastomers, polystyrene-based elastomers, polyolefin-based elastomers, polyamide-based elastomers, polyester-based elastomers, and combinations thereof. The elastic fiber is preferably a polyurethane-based elastomer, from the viewpoint of low distortion after elongation and high heat resistance.

The fiber size of the elastic fiber is preferably in the range of 2-50 μm and more preferably in the range of 15-30 μm.

As used herein, "extensible fiber" means fiber having a smaller elastic limit than the elastic limit of the aforementioned elastic fiber. More specifically, the extensible fiber is fiber having a smaller elastic limit than the stress applied during formation, and capable of plastic deformation by the stress applied during formation. The extensible fiber becomes thinner and longer by plastic deformation. As used herein, extensible fiber that has undergone plastic deformation by the stress of formation will sometimes be referred to as "elongated extensible fiber". An example of elongated extensible fiber is fiber having a uniform diameter, or fiber having a non-uniform diameter, such as one having partial thin sections (necking sections).

Examples of extensible fiber materials include fibers made of polyolefins, such as polyethylene and polypropylene, and polystyrenes, polyesters, polyamides, polyurethanes and polylactic acids, and combinations thereof. The extensible fiber may be composite fiber, such as core-sheath fiber or side-by-side fiber.

The extensible fiber is preferably fiber comprising polypropylene and polyethylene, from the viewpoint of low crystallinity and high elongation.

The fiber size of the extensible fiber is preferably in the range of about 1 to about 40 µm, and more preferably in the range of about 5 to about 25 µm. The fiber size of the extensible fiber is also preferably smaller than the fiber size of the elastic fiber. This will allow flexibility, high bulk and a masking property to be imparted to the nonwoven fabric of the invention.

In the nonwoven fabric having projections and recesses comprising extensible fiber and elastic fiber 1 according to the invention, as shown in FIG. 1, the projections 3 and recesses 4 are each parallel to the first direction A, and alternately arranged in the direction perpendicular to the first direction A, but there are no particular restrictions on the pattern of the plurality of projections and plurality of recesses on the first surface of the nonwoven fabric of the invention, and the nonwoven fabric of the invention may have the plurality of projections and plurality of recesses on the first surface in a predetermined pattern, formed by the method described below.

Figure 2:
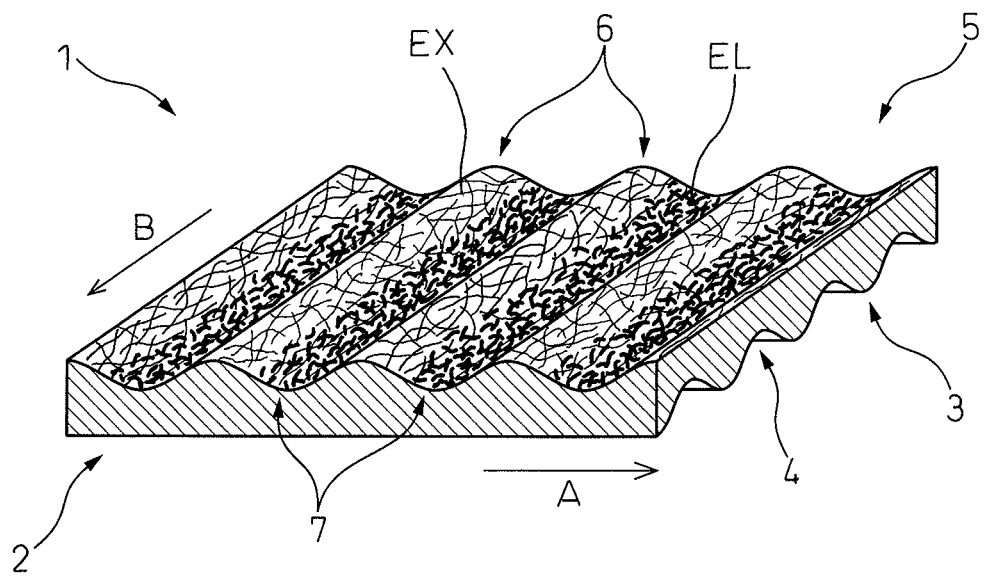
FIG. 2 is a schematic diagram showing another aspect of the nonwoven fabric having projections and recesses comprising extensible fiber and elastic fiber according to the invention.

In the aspect shown in FIG. 1, the second surface on the side opposite the first surface is flat, but according to another aspect of the invention, irregularities may be present on the second surface, as shown in FIG. 2.

Also, the aspect shown in FIG. 1 has the extensible fiber EX oriented along the first direction A on the projections 3, but the extensible fiber in the nonwoven fabric of the invention is not limited thereto and does not need to be oriented.

When the second surface is flat, the second surface will have more excellent adhesion when bonded to another nonwoven fabric.

In a separate aspect of the invention, the nonwoven fabric of the invention has a plurality of projections and a plurality of recesses on the second surface, which is the side opposite the first surface, and the proportion of extensible fiber in the projections on the second surface is higher than the proportion of extensible fiber in the recesses on the second surface.

The proportion of extensible fiber on the second surface may be measured by a solvent method or dyeing method, similar to the first surface.

FIG. 2 is a schematic diagram showing another aspect of the nonwoven fabric having projections and recesses comprising extensible fiber and elastic fiber. The nonwoven fabric having projections and recesses comprising extensible fiber and elastic fiber 1, shown in FIG. 2, has a second surface 5 on the side opposite the first surface 2, and the second surface 5 has a plurality of projections 6 and a plurality of recesses 7. According to the aspect shown in FIG. 2, the first surface may be the same as or different from the first surface shown in FIG. 1.

In the nonwoven fabric having projections and recesses comprising extensible fiber and elastic fiber 1, shown in FIG. 2, the projections 6 are rich in extensible fiber EX while the recesses 7 are rich in elastic fiber EL, and the proportion of extensible fiber in the projections 6 is higher than the proportion of extensible fiber in the recesses 7. Also, in the nonwoven fabric having projections and recesses comprising extensible fiber and elastic fiber 1 shown in FIG. 2, the projections 6 and the recesses 7 are both parallel to the second direction B, and are alternately arranged in the direction perpendicular to the second direction B. In the aspect shown in FIG. 2, the extensible fiber EX in the projections 6 and the elastic fiber EL in the recesses 7 are not particularly oriented. Also, the first direction A and second direction B are perpendicular in the nonwoven fabric having projections and recesses comprising extensible fiber and elastic fiber 1 shown in FIG. 2.

A nonwoven fabric having projections and recesses comprising extensible fiber and elastic fiber, such as shown in FIG. 2, has a proportion of extensible fiber in the projections on the second surface that is higher than the proportion of extensible fiber in the recesses on the second surface, and it therefore exhibits excellent feel on the skin and excellent elasticity, similar to the first surface.

The nonwoven fabric having projections and recesses comprising extensible fiber and elastic fiber, shown in FIG. 2, also has a plurality of recesses on the first surface and a plurality of recesses on the second surface, and it therefore has excellent air permeability in the thickness direction of the nonwoven fabric, while it also has a plurality of projections and a plurality of recesses on the first surface and a plurality of projections and a plurality of recesses on the second surface, and it therefore has excellent air permeability in the planar directions of the nonwoven fabric, and especially in the first direction and second direction.

In the nonwoven fabric having projections and recesses comprising extensible fiber and elastic fiber 1 according to the invention, as shown in FIG. 2, the projections 3 and recesses 4 are each parallel to the first direction A, and alternately arranged in the direction perpendicular to the first direction A, but there are no particular restrictions on the pattern of the plurality of projections and plurality of recesses on the first surface of the nonwoven fabric of the invention.

Also, in the nonwoven fabric having projections and recesses comprising extensible fiber and elastic fiber 1 according to the invention, as shown in FIG. 2, the projections 6 and recesses 7 are each parallel to the second direction B, and alternately arranged in the direction perpendicular to the second direction B, but there are no particular restrictions on the pattern of the plurality of projections and plurality of recesses on the second surface of the nonwoven fabric of the invention, and the nonwoven fabric of the invention may have the plurality of projections and plurality of recesses on the second surface in a predetermined pattern, formed by the method described below.

Furthermore, while there is no particular orientation of the extensible fiber EX in the projections 6 or the orientation of the elastic fiber EL in the recesses 7 in the aspect shown in FIG. 2, there is no limitation to this in the nonwoven fabric of the invention, and the extensible fiber EX in the projections 6 may have an orientation along the second direction B, and/or the elastic fiber EL in the recesses 7 may have an orientation along the second direction B.

Also, the first direction A and second direction B are perpendicular in the nonwoven fabric having projections and recesses comprising extensible fiber and elastic fiber 1 shown in FIG. 2, but there is no restriction to this relationship between the first direction and second direction according to the invention, and the first direction and second direction may have any desired angle between them. For example, the first direction and second direction may be parallel, or in other words, the angle between them may be 0°. According to this aspect, the elasticity is excellent in the direction perpendicular to the first direction (and the second direction), and the air permeability is excellent in the planar directions, and especially the first direction (and second direction).

The nonwoven fabric of the invention preferably has the first direction and second direction perpendicular to each other. In addition, the nonwoven fabric of the invention more preferably has the first direction as the machine direction (hereunder also referred to as "direction MD") and the second direction as the cross direction perpendicular to the machine direction (hereunder, the cross direction perpendicular to the machine direction will also be referred to simply as "cross direction" or "direction CD").

According to yet another aspect of the invention, the nonwoven fabric of the invention may have one or a plurality of open holes, and more specifically, the nonwoven fabric of the invention may have one or a plurality of open holes connecting the recesses on the first surface with the recesses on the second surface.

Figure 3:
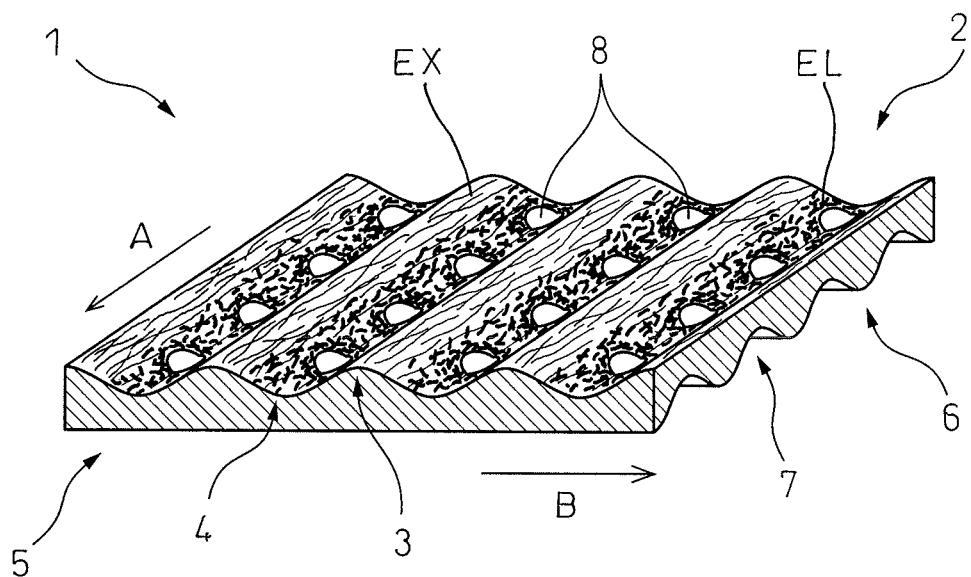
FIG. 3 is a schematic diagram showing yet another aspect of the nonwoven fabric having projections and recesses comprising extensible fiber and elastic fiber according to the invention.
Figure 4:
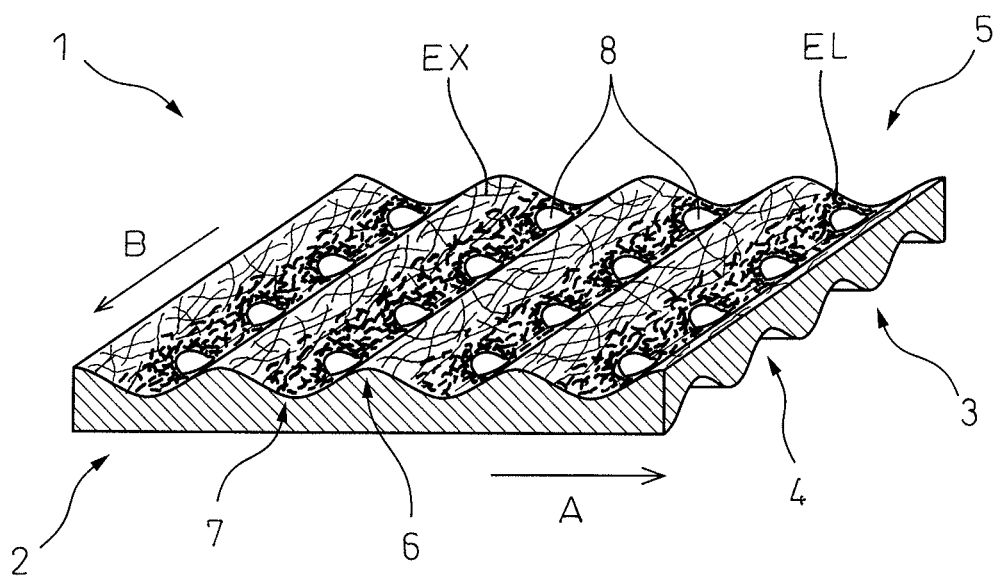
FIG. 4 is a schematic diagram showing yet another aspect of the nonwoven fabric having projections and recesses comprising extensible fiber and elastic fiber according to the invention.

FIG. 3 and FIG. 4 are schematic diagrams showing yet other aspects of the nonwoven fabric having projections and recesses comprising extensible fiber and elastic fiber according to the invention. The nonwoven fabric having projections and recesses comprising extensible fiber and elastic fiber 1 of the invention, shown in FIG. 3 and FIG. 4, each have a first surface 2, and the first surface 2 has projections 3 and recesses 4 each parallel to the first direction A, that are alternating in the direction perpendicular to the first direction A, while the second surface 5 has projections 6 and recesses 7 each parallel to the second direction B, that are alternating in the direction perpendicular to the second direction B. The nonwoven fabric having projections and recesses comprising extensible fiber and elastic fiber 1, shown in FIG. 3, also has open holes 8 that connect the recesses 4 and recesses 7.

On the first surface 2 of the nonwoven fabric having projections and recesses comprising extensible fiber and elastic fiber 1, shown in FIG. 3, the projections 3 are rich in extensible fiber EX while the recesses 4 are rich in elastic fiber EL, and the proportion of extensible fiber in the projections 3 is higher than the proportion of extensible fiber in the recesses 4. In the projections 3, the extensible fiber EX tends to be situated along the first direction A.

On the second surface 5 of the nonwoven fabric having projections and recesses comprising extensible fiber and elastic fiber 1, shown in FIG. 4, the projections 6 are rich in extensible fiber EX while the recesses 7 are rich in elastic fiber EL, and therefore the proportion of extensible fiber in the projections 6 is higher than the proportion of extensible fiber in the recesses 7.

Also, the elastic fiber EL is situated surrounding the open holes 8 in the recesses 4 and recesses 7 in FIG. 3 and FIG. 4.

The nonwoven fabric having projections and recesses comprising extensible fiber and elastic fiber, shown in FIG. 3 and FIG. 4, also has a plurality of recesses on the first surface and a plurality of recesses on the second surface, as well as one or a plurality of open holes, and it therefore has particularly excellent air permeability in the thickness direction of the nonwoven fabric, while it also has a plurality of projections and a plurality of recesses on the first surface and a plurality of projections and a plurality of recesses on the second surface, such that it has excellent air permeability in the planar directions of the nonwoven fabric, and especially in the first direction and second direction. Also, the nonwoven fabric having projections and recesses comprising extensible fiber and elastic fiber, such as shown in FIG. 3 and FIG. 4, has one or a plurality of open holes that can change their structure during extension, and therefore the strength is low during initial extension and the fabric can easily follow movement of the body.

In FIG. 3, the projections 3 and recesses 4 on the first surface and the projections 6 and recesses 7 on the second surface are oriented in specific directions, but their directions and orientations are not particularly restricted for the nonwoven fabric of the invention. The orientation of the extensible fiber and elastic fiber may also be as desired, and the extensible fiber and/or elastic fiber in the plurality of projections on the first surface, the plurality of recesses on the first surface, the plurality of projections on the second surface and/or the plurality of recesses on the second surface may be oriented or non-oriented.

[Method of Producing Nonwoven Fabric Having Projections and Recesses Comprising Extensible Fiber and Elastic Fiber]

The method of producing a nonwoven fabric having projections and recesses comprising extensible fiber and elastic fiber according to the invention comprises a step of providing a nonwoven fabric that comprises extensible fiber and elastic fiber.

The nonwoven fabric which comprises extensible fiber and elastic fiber is not particularly restricted so long as it is a nonwoven fabric comprising the aforementioned extensible fiber and elastic fiber, and for example, it may be a nonwoven fabric produced by any known method, such as an air-through nonwoven fabric, spunbond nonwoven fabric, point bond nonwoven fabric, spunlace nonwoven fabric, airlaid nonwoven fabric or meltblown nonwoven fabric, or a nanofiber-containing nonwoven fabric.

The extensible fiber and elastic fiber can be selected from among these fibers, and the fiber size of the extensible fiber is preferably selected in consideration of thinning of the fiber size in subsequent steps.

The fiber lengths of the fibers are not particularly restricted, and there may be mentioned staple fibers and continuous filaments, for example. When two or more fibers are mixed, the fiber lengths of the fibers may be the same or different.

The nonwoven fabric comprising extensible fiber and elastic fiber preferably has a hydrophilic property. This will allow contacted hydrophilic excreta (urine, sweat, stool, etc.) to pass through the interior of the nonwoven fabric more easily without remaining on the surface of the nonwoven fabric.

Examples of nonwoven fabrics comprising extensible fiber and elastic fiber and having a hydrophilic property, include nonwoven fabrics produced by treatment of a hydrophobic nonwoven fabric with a hydrophilic agent, nonwoven fabrics produced from composite fibers incorporating a hydrophilic agent, and nonwoven fabrics coated with a surfactant. Nonwoven fabrics comprising extensible fiber and elastic fiber and having a hydrophilic property also include nonwoven fabrics produced from fibers with innate hydrophilicity, such as natural and/or semi-synthetic fibers.

The method of the invention comprises a step of non-homogeneous stretching a nonwoven fabric comprising extensible fiber and elastic fiber so as to form a nonwoven fabric having high-stretch regions and low-stretch regions (this will hereunder also be referred to as "non-homogeneous stretching step").

The non-homogeneous stretching step is carried out in the nonwoven fabric comprising the extensible fiber and elastic fiber partially (i) to destroy the fiber joining points in the nonwoven fabric and create a partial web state of the anchored fibers, and/or (ii) to form extended extensible fiber between the fiber joining points in the nonwoven fabric. The extended extensible fiber easily moves when treated with a fluid, and therefore irregularities are easily formed in the nonwoven fabric.

Since the elastic fiber has a higher elastic limit than the stress applied during the non-homogeneous stretching step, the elastic fiber that has been temporarily extended during the non-homogeneous stretching step can subsequently return to its original length.

The joining points may be heat sealing points, in the case of an air-through nonwoven fabric, or they may be thermocompression bonding points in the case of a spunbond nonwoven fabric or point bond nonwoven fabric, or fiber tangling points in the case of a spunlace nonwoven fabric.

As used herein, "high-stretch region" means a region that has been stretched so that the degree of stretch of the extended extensible fiber is higher than in the low-stretch regions, while "low-stretch region" means a region that has been stretched so that the degree of stretch of the extended extensible fiber is lower than in the high-stretch regions, and it includes regions in which no extended extensible fiber has been formed, i.e. unstretched regions.

Also as used herein, the term "non-homogeneous stretching" refers to stretching so as to form a nonwoven fabric having high-stretch regions and low-stretch regions, or in other words, stretching so as to form a nonwoven fabric having different degrees of extension of the extended extensible fiber, depending on the location.

The non-homogeneous stretching step is not particularly restricted so long as it allows formation of a nonwoven fabric with high-stretch regions and low-stretch regions, and it may be carried out by any desired means, such as passing the nonwoven fabric comprising the extensible fiber and elastic fiber, through the gap between a pair of gear rolls each having a rotational axis line perpendicular to the machine direction and rotating while engaging the plurality of teeth arranged around the peripheral surface of each gear roll (this will hereunder also be referred to as "gear stretching").

Figure 5:
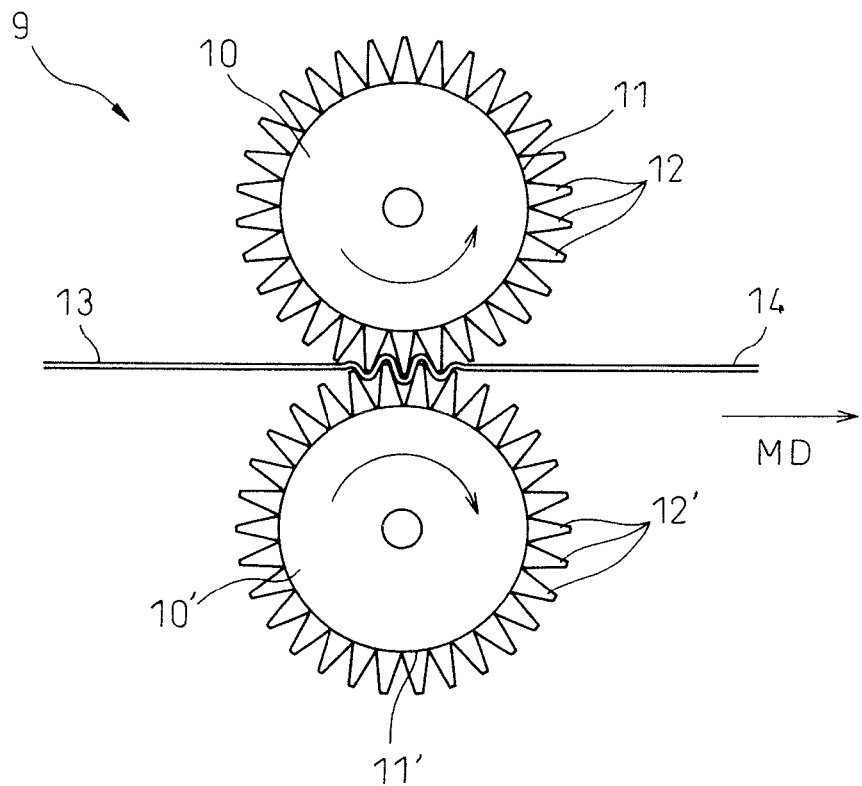
FIG. 5 is a schematic diagram illustrating gear stretching.

FIG. 5 is a schematic diagram illustrating gear stretching. The gear stretcher 9 shown in FIG. 5 has a pair of gear rolls 10 and 10'. A plurality of teeth 12 and 12' are arranged around the peripheral surfaces 11 and 11' of the gear rolls 10 and 10'. In the gear stretcher 9 shown in FIG. 5, the rotational axis lines of the gear rolls 10 and 10' are both perpendicular to the machine direction MD of the nonwoven fabric. The plurality of teeth 12 and 12' are arranged parallel to the rotational axis lines of the respective peripheral surfaces 11 and 11'.

In the gear stretcher 9 shown in FIG. 5, the nonwoven fabric comprising the extensible fiber and elastic fiber 13 is passed through the roll gap between the pair of gear rolls 10 and 10', and when it passes through the gear rolls 10 and 10', the nonwoven fabric comprising the extensible fiber and elastic fiber 13 is stretched by the mutually engaging plurality of teeth 12 and 12' of the gear rolls 10 and 10', on the three-point bending principle, to form a nonwoven fabric 14 having high-stretch regions and low-stretch regions. The nonwoven fabric 14 having high-stretch regions and low-stretch regions has alternating high-stretch regions and low-stretch regions in the machine direction MD, which are parallel to the cross direction.

In the nonwoven fabric comprising the extensible fiber and elastic fiber 13, the body of the nonwoven fabric is anchored in the regions that are in contact with the tips of the plurality of teeth 12 and 12', and therefore undergoes little or no stretching, forming the low-stretch regions. On the other hand, large stretching occurs in the regions that are not in contact with the tips of the plurality of teeth 12 and 12', forming the high-stretch regions.

Figure 6:
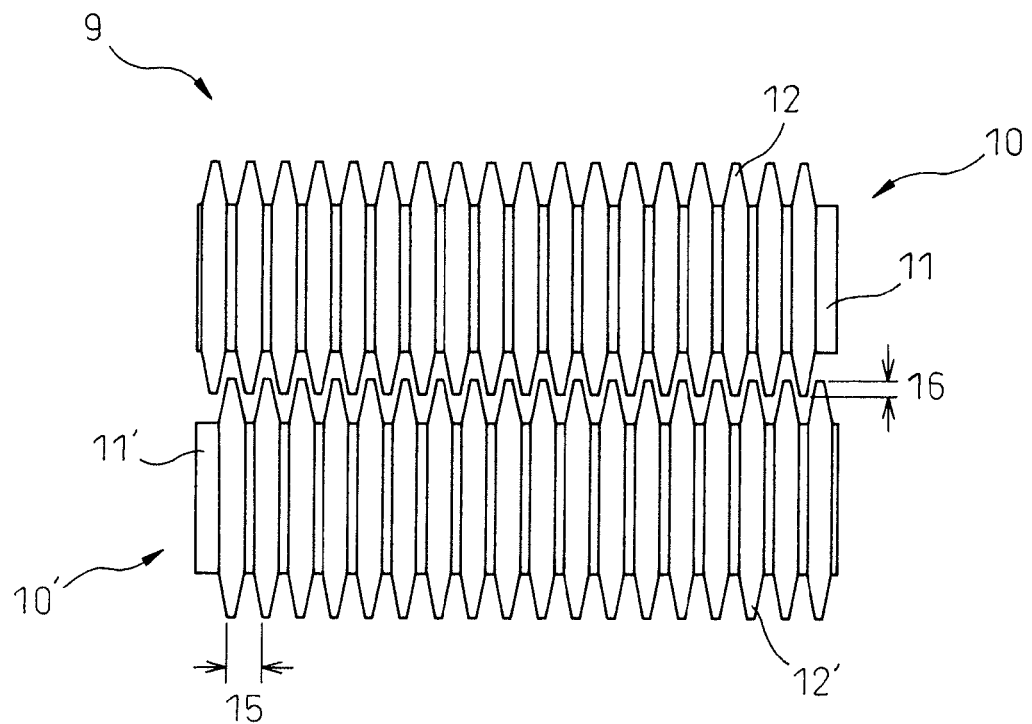
FIG. 6 is a schematic diagram illustrating gear stretching.

Gear stretching can also be accomplished using a gear stretcher as shown in FIG. 6.

FIG. 6 is a schematic diagram illustrating gear stretching. The gear stretcher 9 shown in FIG. 6 has a pair of gear rolls 10 and 10'. A plurality of teeth 12 and 12' are arranged around the peripheral surfaces 11 and 11' of the gear rolls 10 and 10'. In the gear stretcher 9 shown in FIG. 6, the plurality of teeth 12 and 12' are arranged on the respective peripheral surfaces 11 and 11' in a manner perpendicular to the rotational axis lines of the gear rolls 10 and 10'. When the plurality of teeth 12 and 12' are arranged in this manner, it is possible to form a nonwoven fabric having high-stretch regions and low-stretch regions, each parallel to the machine direction MD, and alternating in the cross direction.

Figure 7:
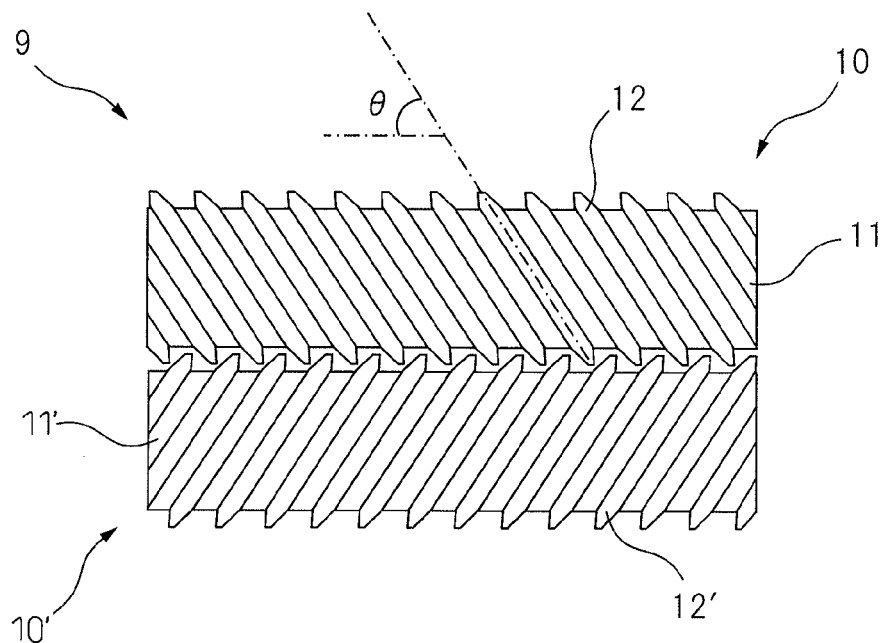
FIG. 7 is a schematic diagram illustrating gear stretching.

The gear stretching may also be accomplished using a gear stretcher having a plurality of teeth arranged around the peripheral surfaces of gear rolls, and slanted with respect to the rotational axis lines of the gear rolls, as shown in FIG. 7. FIG. 7 is a schematic diagram illustrating gear stretching. The gear stretcher 9 shown in FIG. 7 has a pair of gear rolls 10 and 10'. A plurality of teeth 12 and 12' are arranged around the peripheral surfaces 11 and 11' of the gear rolls 10 and 10'. In the gear stretcher 9 shown in FIG. 7, the rotational axis lines of the gear rolls 10 and 10' are both perpendicular to the machine direction MD of the nonwoven fabric. The plurality of teeth 12 and 12' are arranged around the peripheral surfaces 11 and 11' at a fixed angle of θ with respect to the rotational axis line.

The gear stretcher may be appropriately selected depending on the desired performance for the nonwoven fabric to be formed.

When high elasticity is required, the nonwoven fabric comprising the extensible fiber and elastic fiber may be subjected to stretching several times using a gear stretcher, such as shown in FIG. 5 to FIG. 7.

In these gear stretchers, the gear pitch is preferably about 1 to 10 mm and more preferably about 2 to 6 mm. If the gear pitch is less than about 1 mm it may be necessary to reduce the thickness of the gear blades and portions of the nonwoven fabric may become severed, while if the gear pitch is greater than about 10 mm, the draw ratio may be reduced and it may become difficult for extended extensible fibers to be formed.

The gear pitch is the spacing between one tooth and another tooth, and it is denoted by numeral 15 in FIG. 6.

In this gear stretcher, the gear tooth cutting depth is preferably about 0.5 mm or greater. If the gear tooth cutting depth is less than about 0.5 mm, the nonwoven fabric stretching may be inadequate and it may be difficult to form high-stretch regions.

The gear tooth cutting depth is the depth at the section where the top gear roll tooth and bottom gear roll tooth overlap, and it is denoted by numeral 16 in FIG. 6.

For a nonwoven fabric having high-stretch regions and low-stretch regions, the draw ratio for each gear stretching is preferably about 30-400% and more preferably about 50-200%. If the draw ratio is lower than about 30% the extended extensible fiber may not be formed, and if the draw ratio is higher than about 400%, the strength of the nonwoven fabric with high-stretch regions and low-stretch regions will tend to be weakened and the elongated extensible fiber will tend to be shed preferentially, often causing transport problems, and/or the extensible fiber may undergo breakage.

As used herein, the term "draw ratio" refers to the value calculated by the following formula:

$$\text{Draw ratio}(\%) = 100 \times \left[ \frac{\sqrt{P^2 + 4D^2}}{P} - 1 \right]$$

where P is the gear pitch and D is the gear tooth cutting depth.

The reel-off speed of the nonwoven fabric comprising the extensible fiber and elastic fiber will vary depending on the desired draw ratio, but it may be about 10 m/min or greater, for example. The take-up speed of the nonwoven fabric having alternating high-stretch regions and low-stretch regions will vary depending on the draw ratio, etc., and when the nonwoven fabric comprising the extensible fiber and elastic fiber has been stretched in the machine direction, the value of the draw ratio on the reel-off speed serves as a measure of the take-up speed.

The method of the invention comprises a step of forming a nonwoven fabric having projections and recesses comprising extensible fiber and elastic fiber by placing the nonwoven fabric having high-stretch regions and low-stretch regions on a support, and spraying a fluid onto the nonwoven fabric having high-stretch regions and low-stretch regions for treatment (hereunder also referred to as "fluid treatment step").

At least a portion of the web fiber and/or extended extensible fiber present in the high-stretch regions, formed in the non-homogeneous stretching step, is impacted with the sprayed fluid on the side impacting with the fluid (hereunder referred to as "fluid-impacting side"), and is then rebounded and separated out in a planar direction, such as the cross direction. More specifically, the extended extensible fiber in the sections blasted with the sprayed fluid moves elsewhere, with mainly the elastic fiber remaining, so that a plurality of recesses are formed on the first surface. The elastic fiber is subjected to the force of the fluid impact, but since it stops with stress at less than the elastic limit, it usually returns to its original location after the fluid has been sprayed. Therefore, the plurality of recesses on the first surface are rich in elastic fiber. The extended extensible fiber forms projections on both sides of the plurality of recesses on the first surface. Therefore, the plurality of projections on the first surface are rich in extensible fiber. In some cases, the fluid-impacting side corresponds to the first surface of the nonwoven fabric having projections and recesses comprising extensible fiber and elastic fiber, and the direction of the trajectory through which the fluid is blasted corresponds to the first direction.

Also, on the side opposite the fluid-impacting side (hereunder referred to as "non-fluid-impacting side", corresponding to the second surface), at least a portion of the web fiber and/or extended extensible fiber moves along the flow of the fluid passing through the nonwoven fabric.

The fluid used in the fluid treatment step may be air, such as heated air, or water vapor, or water, such as hot water.

The fluid may be blasted from an anchored fluid nozzle onto the nonwoven fabric having high-stretch regions and low-stretch regions, or it may be blasted from a fluid nozzle that is reciprocating in the cross direction. The fluid may also be continuously or intermittently blasted from a fluid nozzle onto the nonwoven fabric having high-stretch regions and low-stretch regions. These may also be used in combination to form a plurality of projections and a plurality of recesses on the first surface, having different patterns including a predetermined pattern.

The fluid may be appropriately selected depending on the form of the nonwoven fabric having high-stretch regions and low-stretch regions. For example, for treatment of a nonwoven fabric with a low gear pitch and a large draw ratio, air or water vapor is preferably selected as the fluid as this will allow movement of primarily the extended extensible fiber with relatively low energy. Furthermore, since the joining points between fibers are increased in number when using a nonwoven fabric with a large gear pitch and many low-stretch regions, a relatively high energy is necessary for movement of the extended extensible fiber, and therefore water or water vapor is preferably selected as the fluid, with water vapor being more preferred. This is because moisture does not easily remain in the sections with a large composite fiber content and the joining points between the sections with a high composite fiber content are not usually destroyed, so that the extended extensible fibers in the sections that are to undergo movement can easily move.

The fluid treatment step can be carried out by a known method using an apparatus known in the technical field.

According to one aspect of the method of the invention, the support used to support the nonwoven fabric with high-stretch regions and low-stretch regions may be a support commonly used in the technical field, such as a metal or plastic conveyor net, or a paper-making web. The support will usually be one with fluid permeability.

According to a different aspect of the method of the invention, a support having protrusions and depressions may be used for further improved air permeability, feel on the skin (for example, low contact area) and fluid take-up properties of the nonwoven fabric.

According to the invention, a "protrusion" is a section used to form a plurality of recesses on the second surface of the nonwoven fabric, and a "depression" is a section used to form a plurality of projections on the second surface of the nonwoven fabric.

Figure 8:
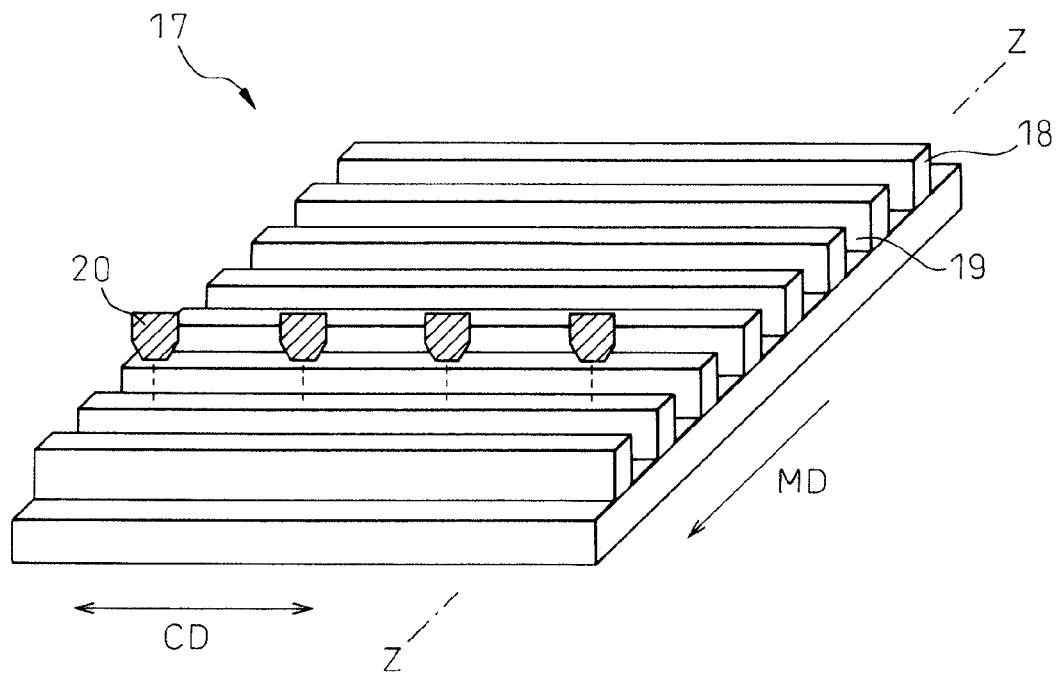
FIG. 8 is a diagram showing an example of a support for a nonwoven fabric, used on a conveyor.

FIG. 8 is a diagram showing an example of a support used on a conveyor.

The support 17 shown in FIG. 8 has protrusions 18 and depressions 19 running parallel in the cross direction CD, and the protrusions 18 and depressions 19 are alternately arranged in the machine direction MD. A fluid nozzle 20 is also shown in FIG. 8, and below the fluid nozzle 20 under the support 17 there is provided a suction section (not shown) that receives fluid. In FIG. 8, the protrusions 18 and depressions 19 have cubic shapes, and are disposed in an alternating arrangement.

Also, the protrusions and depressions in FIG. 8 are arranged parallel to the cross direction and alternating in the machine direction, but there are no particular restrictions on the shapes and arrangement of the protrusions and depressions for the method of the invention, and for example, the protrusions and depressions: (i) may be protrusions and depressions that are all parallel to the machine direction and alternately arranged in the cross direction, (ii) may be protrusions and depressions that are slanted with respect to the machine direction and alternately arranged in the direction perpendicular to the slanted direction, or (iii) may be protrusions and/or depressions having predetermined shapes (for example, cubic, cylindrical or hemispherical) that are disposed in a predetermined arrangement (for example, a heart-shaped or star-shaped arrangement).

When a support having protrusions and depressions is used, it is possible to form a nonwoven fabric with a larger plurality of projections and deeper plurality of recesses (with one or more open holes depending on the case), than when using a support without protrusions and depressions.

This phenomenon will be concretely described with reference to FIG. 8. When the fluid sprayed from the fluid nozzle 20 impacts the protrusions 18, it flows into and around the depressions 19. As a result, extended extensible fiber with a high degree of freedom moves toward the depressions 19 with the flow of the fluid, and therefore primarily only elastic fiber remains at the locations where the fluid and protrusions 18 cross, so that the amount of fiber per unit area is reduced and a plurality of recesses are formed on the second surface of the nonwoven fabric. Although the elastic fiber temporarily extends by the force of the fluid, since application of stress stops at less than the elastic limit, it is usually restored to its original form after the fluid is gone and stress is no longer applied.

Therefore, the plurality of recesses on the second surface are rich in elastic fiber. When the fluid-blasting force is strong, the elastic fiber will also move to a certain degree, and one or more open holes are formed connecting the recesses of the first surface and the recesses of the second surface.

Since the extended extensible fiber aggregates at locations where the fluid and the depressions 19 cross, the amount of fiber per unit area is increased and a plurality of projections are formed on the second surface of the nonwoven fabric, the plurality of projections on the second surface being rich in extensible fiber. In the case of FIG. 8, the second direction is the direction of the protrusions 18 and depressions 19, i.e. the cross direction. Since the extended extensible fibers tend to rise in the thickness direction of the nonwoven fabric at the plurality of projections on the second surface, the nonwoven fabric is imparted with compression resistance and also an improved fluid take-up property. In addition, since the nonwoven fabric having projections and recesses comprising extensible fiber and elastic fiber 1 has a plurality of projections on the second surface, it has excellent air permeability, and especially air permeability in the planar directions, and superior feel on the skin due to reduced contact area.

A nonwoven fabric formed using a support having protrusions and depressions has on the second surface a plurality of projections that are higher and a plurality of recesses that are deeper, compared to one formed without using such a support, and it therefore exhibits excellent air permeability, and especially air permeability in the planar direction, as well as excellent compression resistance, fluid take-up properties and feel on the skin. The plurality of projections on the second surface are composed mainly of extensible fiber having relatively high fiber strength, and they therefore have high strength and resistance to crushing. When the nonwoven fabric formed using a support having protrusions and depressions has one or a plurality of open holes, the air permeability in the thickness direction is excellent.

Of the air permeability in the planar directions, the nonwoven fabric formed using the support shown in FIG. 8 has particularly excellent air permeability in the cross direction. This is because the locations of the nonwoven fabric corresponding to the protrusions of the support (the recesses on the second surface of the nonwoven fabric) can serve as gas channels.

The protrusions preferably have lower fluid permeability than the fluid permeability of the depressions. This is because with low fluid permeability at the protrusions, the fluid impacting the protrusions will flow toward the depressions, thus allowing formation of a plurality of projections of greater height on the second surface of the nonwoven fabric having projections and recesses comprising extensible fiber and elastic fiber, which has been formed by the method of the invention.

The material of the protrusions may be metal, plastic or the like.

There are no particular restrictions on the protrusions and depressions, and for example, they may be formed by placing a cubic or tubular metal over a metal or plastic conveyor net, paper-making web, punching plate or the like that is commonly used as a fluid-permeable support, in a predetermined arrangement, such as holding them at a prescribed spacing.

Examples of supports having protrusions and/or depressions with predetermined shapes (for example, cubic, cylindrical or hemispherical) disposed in a predetermined arrangement (for example, a heart-shaped or star-shaped arrangement) include supports having hemispherical metal situated in a predetermined arrangement (such as a heart-shaped arrangement) on a punching plate. When such a support is used, it is possible to form a nonwoven fabric having recesses in a predetermined pattern (for example, heart-shaped) on the second surface.

Also, by using a support with protrusions and depressions, in which hemispherical dent shapes are disposed in a predetermined arrangement (such as a heart shape) on a punching plate, it is possible to form a nonwoven fabric having a plurality of projections in a predetermined pattern (such as a heart shape) on the second surface.

When the fluid treatment step is to be carried out on a roll, a roll-like support may be used, having the outer periphery constructed of a fluid-permeable material, such as a mesh and having protrusions and depressions situated with predetermined shapes and a predetermined arrangement, on the peripheral surface. The predetermined shapes and arrangement may be the shapes and arrangement described above.

Figure 9:
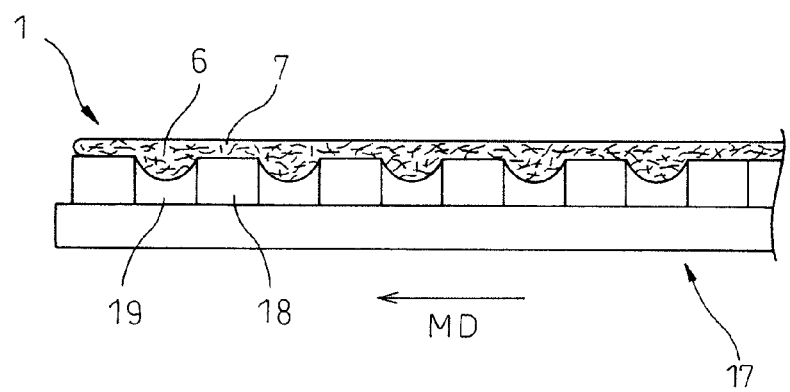
FIG. 9 is a diagram illustrating an example of a nonwoven fabric having projections and recesses, formed using the support shown in FIG. 8.

FIG. 9 is a diagram showing a nonwoven fabric having projections and recesses comprising extensible fiber and elastic fiber 1 formed using the support 17 shown in FIG. 8. FIG. 9 corresponds to a cross-section along Z-Z in FIG. 8. In FIG. 9, the projections 6 are formed in the depressions 19 of the support 17, while the recesses 7 are formed on the protrusions 18 of the support 17.

Figure 10:
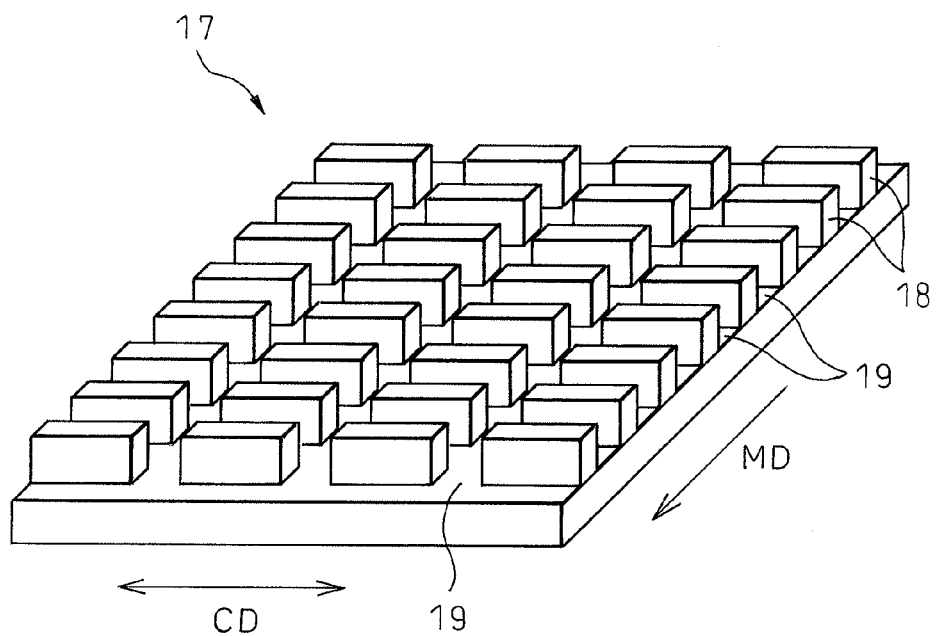
FIG. 10 is a diagram showing another example of a support for a nonwoven fabric, used on a conveyor.

According to yet another aspect of the invention, the support shown in FIG. 10 may be used. The protrusions 18 and depressions 19 have cubic and lattice shapes, respectively, in the support 17 shown in FIG. 10, and the protrusions 18 are disposed in an arrangement with a fixed spacing in the machine direction and the cross direction.

In a support having protrusions and depressions, their widths will differ depending on the properties required for the nonwoven fabric that is to be formed, but as an example, the support shown in FIG. 8 preferably has protrusion widths in the range of about 0.5 to about 10 mm, and depression widths in the range of about 1 to about 10 mm.

The nonwoven fabric having projections and recesses comprising extensible fiber and elastic fiber has an air permeability in the thickness direction of preferably at least about 500 $m^3/m^2/min$, more preferably at least about 1000 $m^3/m^2/min$ and most preferably at least about 2000 $m^3/m^2/min$. A higher air permeability in the thickness direction will prevent mustiness when the fabric is used at sites in contact with the human body.

The nonwoven fabric having projections and recesses comprising extensible fiber and elastic fiber also has an air permeability in the planar directions of preferably at least about 5 $m^3/m^2/min$, more preferably at least about 10 $m^3/m^2/min$ and even more preferably at least about 20 $m^3/m^2/min$. A higher air permeability in the horizontal direction will prevent high-humidity air from accumulating near the skin and help it to be removed to the outside.

The nonwoven fabric of the invention is useful as an absorbent article, such as a sanitary product or disposable diaper, a cleaning product, such as a wiper, or a medical product, such as a mask.

The nonwoven fabric of the invention can be used on the skin contact surface of an absorbent article (the side that contacts the skin of a wearer). The absorbent article comprises, for example, a liquid-permeable front sheet, a liquid-impermeable back sheet, and an absorbent body situated between both sheets, and it absorbs and retains excreta, such as urine and menstrual blood into the absorbent body through the front sheet.

EXAMPLES

The invention will now be explained in greater detail using examples and comparative examples, with the understanding that the invention is in no way limited by the examples.

The evaluated properties and measuring conditions in the examples and comparative examples were as follows.

[Basis Weight]

The basis weight was measured according to JIS L 1906, 5.2.

[Bulk]

The bulk was measured using a THICKNESS GAUGE UF-60 by Daiei Kagaku Seiki Mfg. Co., Ltd.

[Air Permeability]

The air permeability was measured using a KES-F8-AP1 air permeability tester by Kato Tech Corp., with calculation in units of $m^3/m^2/min$.

The air permeability in the thickness direction of the nonwoven fabric was measured by setting the nonwoven fabric, cut to a size of 100 mm×100 mm, in the air permeability tester.

The air permeability in the planar direction of the nonwoven fabric was measured with the nonwoven fabric cut to a size of 100 mm×100 mm and set in the air permeability tester, a 100 mm×100 mm acrylic board set thereover and application of a pressure of 3.5 $mN/cm^2$.

[Elastic Property]

This was measured using a Model AG-KNI autograph tensile tester by Shimadzu Corp., with the following cycle.

—First Cycle (First Cy)—A sample with a 50 mm width was anchored to a chuck with a chuck distance of 100 mm, extended to 100% elongation at a speed of 100 mm/min (extension) and then restored to the original length at a speed of 100 mm/min (return). The strength per 50 mm width during 50% extension outward was evaluated.

—Second Cycle (Second Cy)—

Next, the first cycle was repeated and the strength per 50 mm width during 50% extension return was evaluated.

The 50% extension period corresponds to the elongation percentage when used in a disposable diaper.

The strength per 50 mm width during 50% extension outward is preferably in the range of no greater than 10N. If the strength exceeds 10N, for use in a disposable diaper, for example, the diaper will be resistant to stretching during wear and will be difficult to put on. As used herein, the strength (N) per 50 mm width will sometimes be abbreviated as N/50 mm.

The strength per 50 mm width during 50% extension return is preferably in the range of about 0.1 to about 5.0N. If the strength is less than about 0.1N, for use in a disposable diaper, for example, the diaper will slip more easily when it is worn, while if the strength exceeds about 5.0N, pressure will be increased on the skin during wearing, potentially producing red marks or gather marks on the skin.

[Proportion of Extensible Fiber]

The nonwoven fabric was cut to a size of 50 mm×50 mm, and fiber near the top part of a projection on the second surface (hereunder referred to as "projection fiber") was cut out with a cutter. The fiber in the projection was then weighed, immersed in 20 mL of dimethylacetamide, and allowed to stand at room temperature for 30 minutes. The remaining fiber was then filtered out, rinsed with ethanol and dried. The proportion of extensible fiber was calculated from the dry mass of the remaining fiber.

The proportion of extensible fiber was calculated in the same manner for fiber near the bottom section of the recesses on the second surface as well.

Examples 1 to 3

Production of Nonwoven Fabric

Polyolefin fiber (fiber size: 21 μm) and polyurethane fiber (fiber size: 25 μm) were produced by a spunbond method, and the produced polyolefin fiber and polyurethane fiber were mixed in a mass ratio of 50:50 to form a web, after which the web was subjected to heat embossing treatment to produce a nonwoven fabric comprising polyolefin fiber as extensible fiber and polyurethane fiber as elastic fiber.

—Gear Stretching Treatment—

The supply nonwoven fabric comprising polyolefin fiber and polyurethane fiber was reeled out at a speed of 10 m/min and passed through four preheated rolls that had been preheated to 80° C., and then subjected to gear stretching with the gear stretcher shown in FIG. 6 (gear pitch: 2.5 mm, gear tooth cutting depth: 3.0 mm, draw ratio: 160%), after which it was subjected to gear stretching with the gear stretcher shown in FIG. 5 (gear pitch: 4.9 mm, gear tooth cutting depth: 7.0 mm, draw ratio: 202%), to form nonwoven fabric 1 as a nonwoven fabric having high-stretch regions and low-stretch regions. The gear temperature of both gear stretchers was 55° C.

In nonwoven fabric 1, embossed sections remained in the low-stretch regions that were in contact with the tips of the teeth. In the high-stretch regions that were not in contact with the tips of the teeth, some of the embossed sections had been crushed, forming web regions.

—Steam Treatment—

Nonwoven fabric 1 was placed on a support having protrusions and depressions each parallel to the cross direction, and alternating in the machine direction, such as shown in FIG. 8. The protrusions did not transmit the fluid, and their widths and heights were 3 mm and 5 mm, respectively. The widths of the depressions were 2 mm. The gear treated nonwoven fabric was then passed through a steam treatment system comprising a plurality of nozzles (φ: 0.5 mm) at a spacing of 2.0 mm, at a speed of m/min, to obtain nonwoven fabrics 2 to 4 as nonwoven fabrics having projections and recesses comprising extensible fiber and elastic fiber. The nonwoven fabrics 2 to 4 each had a plurality of open holes.

The conditions of pressure and water vapor temperature in the steam treatment system are shown in Table 1, together with the properties of the nonwoven fabrics 2 to 4.

The proportion of polyolefin fiber as extensible fiber in each of the nonwoven fabrics 2 to 4 was also evaluated by a dyeing method.

Nonwoven fabrics 2 to 4 were dyed with a dye that colors polyurethane fiber red and does not color polyolefin fiber, and were visually evaluated with an optical microscope. As a result, all of the nonwoven fabrics 2 to 4 were confirmed to have polyolefin fiber as extensible fiber and polyurethane fiber as elastic fiber respectively maldistributed on the first surface and second surface, as shown in FIGS. 3 and 4. More specifically, it was confirmed that the proportion of polyolefin fiber in the projections on the first surface was higher than the proportion of polyurethane fiber in the recesses on the first surface, and the proportion of the polyolefin fiber in the projections on the second surface was higher than the proportion of polyurethane fiber in the recesses on the second surface.

The proportion of polyolefin fiber in the projections on the second surface and the recesses on the second surface of the nonwoven fabric 4 of Example 3 was also evaluated by a solvent method. When the projections in the second surface and the recesses on the second surface were sampled in amounts of 67.7 mg and 39.8 mg, respectively, and evaluated using 20 mL of dimethylacetamide as the solvent, the proportion of polyolefin fiber in the projections on the second surface and the recesses on the second surface were 54 mass % and 43 mass %, respectively. These results confirmed that the proportion of polyolefin fiber in the projections on the second surface of the nonwoven fabric 4 was higher than the proportion of polyolefin fiber in the recesses on the second surface.

The proportion of polyolefin fiber in the nonwoven fabric before gear stretching in Examples 1 to 3 was 50 mass %.

Figure 11:
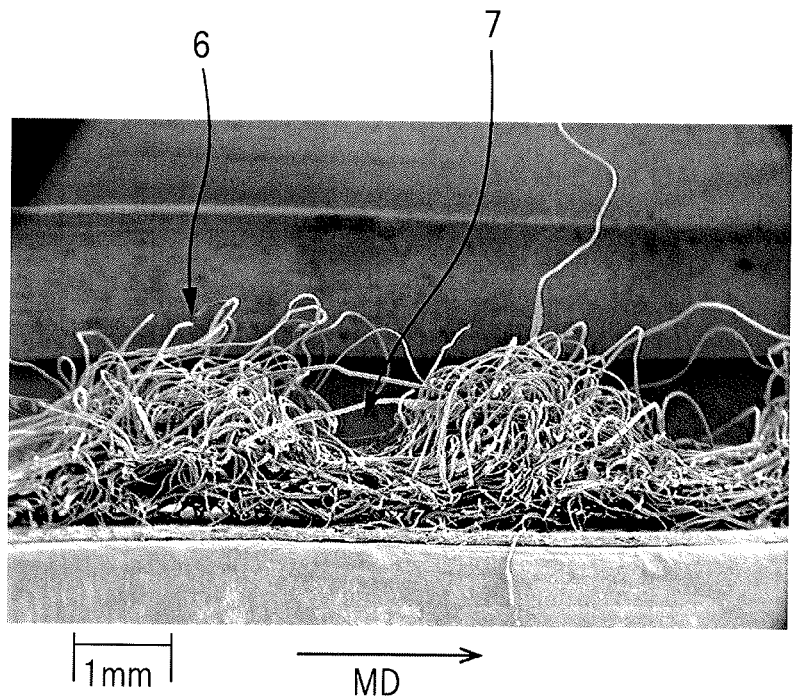
FIG. 11 is a photomicrograph showing a cross-section of the nonwoven fabric 2 formed in Example 1, in the MD direction.

FIG. 11 shows an electron micrograph of a cross-section of the nonwoven fabric 2 in the MD direction.

Comparative Example 1

The nonwoven fabric 1 used in Examples 1 to 3 was used as a sample for Comparative Example 1. The properties are shown in Table 1.

Comparative Example 2

A nonwoven fabric formed according to Example 1 of Patent document 1 was used as nonwoven fabric 5, and the expansion properties thereof are shown in Table 1.

elasticity was produced by steam treatment. This is because the nonwoven fabrics of Examples 1 to 3 had a plurality of open holes, which created structural deformation in the nonwoven fabrics before deformation of the fibers, making it possible to cancel the increase in fusion between the fibers caused by heat treatment and increase in tensile strength due to entanglement between the fibers.

The nonwoven fabric of Comparative Example 2 was hard, and suffered breakup at approximately 90% elongation in the first cycle.

Projections 6 and recesses 7 are shown in FIG. 11 which is a cross-section in the direction MD, and it is seen that the fiber content per unit area is high and the fibers are standing in the projections 6, while the fiber content per unit area is low and the fibers are compressed in the recesses 7.

REFERENCES SIGNS LIST

1 Nonwoven fabric having projections and recesses comprising extensible fiber and elastic fiber
2 First surface
3 Projection

| No. | Nonwoven fabric | Steam treatment | | Basis weight $(g/m^2)$ | Bulk (mm) | Air permeability $(m^3/m^3/min)$ | | Elastic property (N/50 mm)* | |
|---|---|---|---|---|---|---|---|---|---|
| | | Pressure (MPa) | Temperature (° C.) | | | Thickness direction | Horizontal direction | First Cy 50% extension | Second Cy 50% return |
| Example 1 | Nonwoven fabric 2 | 0.3 | 131 | 37.1 | 0.86 | 1350 | 14 | 1.62 | 0.49 |
| Example 2 | Nonwoven fabric 3 | 0.5 | 149 | 38.7 | 0.95 | 1140 | 26 | 1.72 | 0.55 |
| Example 3 | Nonwoven fabric 4 | 0.7 | 162 | 37.2 | 0.89 | 2060 | 31 | 1.59 | 0.66 |
| Comp. Example 1 | Nonwoven fabric 1 | — | — | 36.6 | 0.72 | 430 | 5 | 1.10 | 0.64 |
| Comp. Example 2 | Nonwoven fabric 5 | — | — | 71.9 | 1.64 | 190 | 23 | 12.8 | (Rupture) |

*Value in MD direction.

Examples 1 to 3 and Comparative Example 1 demonstrate that steam treatment increases bulk, and significantly improves air permeability in both the thickness direction and the horizontal directions. This is because the steam treatment in Examples 1 to 3 causes formation of a plurality of projections and a plurality of recesses on the first surface and a plurality of projections and a plurality of recesses on the second surface, of the nonwoven fabric. Nonwoven fabric 4 of Example 3, as well as nonwoven fabric 2 of Example 1 and nonwoven fabric 3 of Example 2, wherein the proportion of extensible fiber in the projections on the second surface was higher than the proportion of extensible fiber in the recesses on the second surface, had low tack due to the elastic fibers and satisfactory feel on the skin.

The nonwoven fabric of Comparative Example 1 lacked irregularities and therefore had low air permeability in the thickness direction, while air channels also failed to form in the planar directions, and therefore air permeability in the planar directions was low. The feel on the skin was also inferior compared to nonwoven fabrics 2 to 4.

The nonwoven fabric of Comparative Example 2 had excellent air permeability in the planar directions, but low air permeability in the thickness direction.

From Examples 1 to 3 and Comparative Example 1 it is seen that, based on the strength per 50 mm width during 50% extension outward in the first cycle, no significant change in

4 Recess
5 Second surface
6 Projection
7 Recess
8 Open hole
9 Gear stretcher
10,10' Gear rolls
11,11' Peripheral surfaces
12,12' Teeth
13 Nonwoven fabric comprising extensible fiber and elastic fiber
14 Nonwoven fabric with high-stretch regions and low-stretch regions
15 Gear pitch
16 Gear tooth cutting depth
17 Support
18 Protrusion
19 Depression
20 Fluid nozzle
EX Extensible fiber
EL Elastic fiber
A First direction
B Second direction
MD Machine direction
CD Cross direction

The invention claimed is:

1. A nonwoven fabric having projections and recesses, said nonwoven fabric comprising:
extensible fiber and elastic fiber,
wherein
the nonwoven fabric is a non-homogeneous stretched nonwoven fabric including high-stretch regions and low-stretch regions,
a first surface of the nonwoven fabric has a plurality of projections and a plurality of recesses, the projections and recesses being formed by placing the non-homogeneous stretched nonwoven fabric having the high-stretch regions and the low-stretch regions on a support and blasting a fluid onto the non-homogeneous stretched nonwoven fabric having the high-stretch regions and the low-stretch regions, and
a mass ratio of the extensible fiber in the projections on the first surface is higher than a mass ratio of the extensible fiber in the recesses on the first surface.

2. The nonwoven fabric according to claim 1, wherein
the nonwoven fabric has a plurality of projections and a plurality of recesses on a second surface, which is opposite the first surface, and
a mass ratio of the extensible fiber in the projections on the second surface is higher than a mass ratio of the extensible fiber in the recesses on the second surface.

3. The nonwoven fabric according to claim 2, wherein the projections and recesses on the first surface are each parallel to a first direction, and are alternately arranged in a direction perpendicular to the first direction.

4. The nonwoven fabric according to claim 3, wherein the projections and recesses on the second surface are each parallel to a second direction, and are alternately arranged in a direction perpendicular to the second direction.

5. The nonwoven fabric according to claim 4, wherein the first direction and the second direction are perpendicular to each other.

6. The nonwoven fabric according to claim 5, wherein the first direction is a machine direction, and the second direction is a cross direction that is perpendicular to the machine direction.

7. The nonwoven fabric according to claim 2, further comprising one or a plurality of open holes connecting the recesses on the first surface and the recesses on the second surface.

8. The nonwoven fabric according to claim 1, wherein a material of the extensible fiber is selected from the group consisting of polyolefins, polystyrenes, polyesters, polyamides, polyurethanes, polylactic acid, and combinations thereof.

9. The nonwoven fabric according to claim 1, wherein a material of the elastic fiber is selected from the group consisting of polyurethane-based elastomers, polystyrene-based elastomers, polyolefin-based elastomers, polyamide-based elastomers, polyester-based elastomers, and combinations thereof.

10. A method of producing a nonwoven fabric, said method comprising:
performing non-homogeneous stretching of a nonwoven fabric comprising extensible fiber and elastic fiber to form high-stretch regions and low-stretch regions in the non-homogeneously stretched nonwoven fabric, and
forming projections and recesses on a first surface of the non-homogeneously stretched nonwoven fabric, by
placing the non-homogeneously stretched nonwoven fabric having the high-stretch regions and the low-stretch regions on a support, and
blasting a fluid onto the first surface of the non-homogeneously stretched nonwoven fabric having the high-stretch regions and the low-stretch regions, wherein the recesses are formed on the first surface in regions corresponding to the blasted fluid which moves a part of the extensible fiber from said regions to adjacent regions to form the projections in the adjacent regions, so that a mass ratio of the extensible fiber in the projections on the first surface is higher than a mass ratio of the extensible fiber in the recesses on the first surface.

11. The method according to claim 10, wherein the non-homogeneous stretching comprises
passing, in a machine direction, the nonwoven fabric comprising the extensible fiber and the elastic fiber through a gap between a pair of gear rolls with rotational axis lines that are perpendicular to the machine direction, and
rotating the pair of gear rolls while a plurality of teeth situated on peripheral surfaces of the gear rolls are mutually engaged with each other.

12. The method according to claim 11, wherein
the plurality of teeth arranged on the peripheral surfaces are perpendicular to the rotational axis lines so as to form the high-stretch regions and the low-stretch regions parallel to the machine direction and alternating in a cross direction which is perpendicular to the machine direction.

13. The method according to claim 10, wherein the non-homogeneous stretching is carried out twice.

14. The method according to claim 10, wherein in said forming the projections and recesses on the non-homogeneously stretched nonwoven fabric, the support has protrusions and depressions with predetermined shapes and arrangement on a side in contact with the non-homogeneously stretched nonwoven fabric.

15. The method according to claim 14, wherein the protrusions and depressions are each parallel to a cross direction which is perpendicular to the machine direction, and are alternately arranged in the machine direction.

16. The method according to claim 10, wherein the fluid is selected from the group consisting of air, water vapor and water.

17. The method according to claim 11, wherein
the plurality of teeth arranged on the peripheral surfaces are parallel to the rotational axis lines so as to form the high-stretch regions and the low-stretch regions parallel to a cross direction and alternating in the machine direction, the cross direction perpendicular to the machine direction.

18. The method according to claim 11, wherein
the plurality of teeth arranged on the peripheral surfaces are oblique to both to the rotational axis lines and the machine direction.

19. The method according to claim 10, wherein
after the non-homogeneous stretching and before the forming the projections and recesses, the first surface and a second, opposite surface of the non-homogeneously stretched nonwoven fabric are flat and free of projections and recesses.

20. A nonwoven fabric, comprising:
extensible fiber and elastic fiber,
wherein the nonwoven fabric is a non-homogeneous stretched nonwoven fabric including high-stretch regions and low-stretch regions, wherein
a first surface of the nonwoven fabric has a plurality of projections and a plurality of recesses,
a mass ratio of the extensible fiber in the projections on the first surface is higher than a mass ratio of the extensible fiber in the recesses on the first surface,
the projections and the recesses on the first surface extend in a first direction, and are alternately arranged in a second direction transverse to the first direction,
a second surface of the nonwoven fabric, opposite to the first surface, has a plurality of projections and a plurality of recesses,
a mass ratio of the extensible fiber in the projections on the second surface is higher than a mass ratio of the extensible fiber in the recesses on the second surface, and
the projections and the recesses on the second surface extend in the second direction, and are alternately arranged in the first direction.

\* \* \* \* \*